United States Patent
Lerchenmueller et al.

(10) Patent No.: US 12,494,700 B2
(45) Date of Patent: Dec. 9, 2025

(54) DRIVE DEVICE FOR A BRAKING DEVICE OF A MOTOR VEHICLE

(71) Applicant: Robert Bosch GmbH, Stuttgart (DE)

(72) Inventors: Klaus Lerchenmueller, Rettenberg (DE); Eduard Maiterth, Heilbronn (DE); Lothar Detels, Burgberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 80 days.

(21) Appl. No.: 17/791,885

(22) PCT Filed: Mar. 3, 2021

(86) PCT No.: PCT/EP2021/055306
§ 371 (c)(1),
(2) Date: Jul. 8, 2022

(87) PCT Pub. No.: WO2021/180534
PCT Pub. Date: Sep. 16, 2021

(65) Prior Publication Data
US 2023/0033633 A1 Feb. 2, 2023

(30) Foreign Application Priority Data
Mar. 13, 2020 (DE) ...................... 10 2020 203 274.2

(51) Int. Cl.
*H02K 29/06* (2006.01)
*F16D 65/16* (2006.01)
*F16D 121/24* (2012.01)

(52) U.S. Cl.
CPC ............ *H02K 29/06* (2013.01); *F16D 65/16* (2013.01); *F16D 2121/24* (2013.01); *H02K 2211/03* (2013.01)

(58) Field of Classification Search
CPC ............ H02K 1/14; H02K 1/18; H02K 1/146; H02K 1/148; H02K 1/185; H02K 1/2706;
(Continued)

(56) References Cited

U.S. PATENT DOCUMENTS

| 6,020,660 A | 2/2000 | Wright |
| 6,208,048 B1 * | 3/2001 | Deynet ................... B60T 8/368 310/71 |
| 2018/0309218 A1 * | 10/2018 | Erndt ................... H01R 13/432 |

FOREIGN PATENT DOCUMENTS

| CN | 105981267 A | 9/2016 | |
| DE | 3842588 C2 * | 12/1992 | ............. H02K 29/08 |

(Continued)

OTHER PUBLICATIONS

English Translation for DE 3842588 C2 (Year: 1992).*
International Search Report for PCT/EP2021/055306, Issued May 28, 2021.

*Primary Examiner* — Bryan R Perez
(74) *Attorney, Agent, or Firm* — NORTON ROSE FULBRIGHT US LLP

(57) ABSTRACT

A drive device for a braking device of a motor vehicle. The drive device includes an electric machine that includes a housing and a rotor that is rotatably supported in the housing, and a rotor position sensor device that includes a circuit board with at least one sensor element that is associated with the rotor. The circuit board has a circular disk-shaped design and is situated coaxially with respect to a rotational axis of the rotor. The circuit board is fastened in or at the electric machine via at least one detent connection.

9 Claims, 3 Drawing Sheets

(58) Field of Classification Search
CPC ............ H02K 1/22; H02K 1/12; H02K 1/145;
H02K 29/06; H02K 2211/03; H02K
11/22; H02K 11/33; H02K 11/0094;
H02K 15/00; H02K 15/10; H02K 15/12;
H02K 5/04; H02K 5/128
See application file for complete search history.

(56) References Cited

FOREIGN PATENT DOCUMENTS

| | | |
|---|---|---|
| JP | H01116556 U | 8/1989 |
| JP | H02119553 A | 5/1990 |
| JP | H09182403 A | 7/1997 |
| JP | 2020010490 A | 1/2020 |
| WO | 2014154240 A1 | 10/2014 |

\* cited by examiner

DRIVE DEVICE FOR A BRAKING DEVICE OF A MOTOR VEHICLE

FIELD

The present invention relates to a drive device for a braking device of a motor vehicle, including an electric machine that includes a housing and a rotor that is rotatably supported in the housing, and a rotor position sensor device that includes a circuit board with at least one sensor element that is associated with the rotor, the circuit board having a circular disk-shaped design and being situated coaxially with respect to a rotational axis of the rotor.

BACKGROUND INFORMATION

For precisely activating electric machines that are electrically commutated, it is necessary to be able to establish the rotor angle position of the rotor of the electric machine at any time in order to activate one or multiple phases of a drive winding as a function of the instantaneous rotor angle position. Correctly positioned fixing of a sensor element that is durable over its lifetime, via which the rotor angle position is to be detected, is therefore necessary. When inductive sensor elements, as utilized in resolvers, for example, are employed, the use of metallically conductive fastening elements is disadvantageous, since they may have an adverse effect on functions and angular accuracy of the sensor element. In addition, large temperature fluctuations which affect the material sometimes occur in the surroundings of the electric machine during its operation, which may result in deformation of the rotor angle position sensor when the individual parts of the sensor are made of materials having different thermal expansion coefficients.

SUMMARY

A drive device according to the present invention may have an advantage that a particularly simple installation of the rotor angle position sensor at the electric machine is provided in a cost-effective and advantageous manner, which also enables the compensation for different expansion coefficients in a simple manner. According to an example embodiment of the present invention, the circuit board of the drive device is fastened in or at the electric machine via at least one detent connection that in particular includes plastic. Due to the detent connection, a particularly simple installation of the circuit board at the drive device or the electric machine, which is also detachable if needed, is possible. In particular, the detent connection is designed as a nondestructively detachable detent connection. Alternatively, the detent connection is designed as a detent connection that is not detachable without destruction, and that ensures particularly high protection from being unintentionally detached. By use of the detent connection, play of movement is preferably provided between the circuit board and the electric machine, which ensures that changes in length, resulting from temperature fluctuations due to different thermal expansion coefficients, do not result in mechanical stresses in the electric machine.

For this purpose, the circuit board is preferably pre-installed on a circular ring-shaped support element, and the support element together with the electric machine forms the detent connection. The pre-installation enables simple and secure fastening of the circuit board to the support element, and the detent connection enables a simple installation of the support element together with the circuit board in or at the electric machine. During the pre-installation, the circuit board is for example screwed, glued, or clamped to the support element, which in particular takes place outside the electric machine, thus further simplifying the installation.

In accordance with an example embodiment of the present invention, the support element preferably includes at least one axially protruding, elastically deformable detent lug, which in the installed state engages behind a retaining section of the electric machine. During the installation, the detent lug is inserted through an opening of the retaining section with elastic deformation of the detent lug, so that due to its inherent elasticity it returns to its original shape after penetrating the opening, and thus engages behind the retaining section of the electric machine, as the result of which the support element is fastened to the electric machine in a form-fit manner.

In accordance with an example embodiment of the present invention, the electric machine preferably includes an end shield via which the rotor of the electric machine is rotatably supported in the housing, and which forms the retaining section. To provide an arrangement of a pivot bearing for the shaft of the electric machine, in particular for the rotor shaft of the electric machine, it is conventional to use one or multiple end shields. These end shields are fastened, for example braced or screwed, in the housing of the electric machine, and thus create a wall in the housing, which in particular is oriented perpendicularly with respect to the rotational axis of the rotor. In particular, an opening is formed in the end shield through which the rotor shaft is guided, and in which a rolling element bearing is generally mounted, whose inner ring is held at the end shield in a rotatably fixed manner via the rotor shaft, and whose outer ring is held at the end shield, fixed to the housing. In the present case, the retaining section preferably has a design that is integrated into such an end shield, so that the detent connection acts between the support element and the end shield. An advantageous arrangement of the rotor position sensor device close to the electric machine, directly at the end shield, is thus made possible.

According to one preferred refinement of the present invention, the support element includes three detent lugs that are uniformly distributed over the circumference of the support element, the end shield including three retaining sections that cooperate with the detent lugs. In particular, the particular retaining section for the particular detent lugs includes an indentation or a recess into which the detent lug may be inserted with elastic deformation in order to engage behind the particular retaining section. The support element preferably includes only three detent lugs that are uniformly distributed over the circumference of the support element. The support element optionally includes more than three detent lugs.

In accordance with an example embodiment of the present invention, the detent lugs are preferably radially (in relation to the rotational axis of the rotor) displaceably supported on the particular retaining section, in particular in each case in a recess of the particular retaining section. The detent lugs are thus radially displaceable in the end shield, which is situated coaxially with respect to the rotor shaft. Due to this displacement, it is possible that temperature-related differences in length in the event of temperature fluctuations do not result in the support element and the end shield being mechanically tensioned or overly stretched. Rather, the particular detent lug may yield radially outwardly when, for example, the material of the support element experiences a greater increase in size than the end shield due to the thermal expansion coefficient of the support element. As a result of the displacement taking place radially, it is ensured that the rotor position sensor device continues to be centrally situated or centered on the end shield. The detent lugs and retaining sections are uniformly distributed over the end shield or the support element, so that in each case they are oriented at an angle of 120° with respect to one another. The support element may thus experience an increase in diameter or a change without thereby moving or rotating, viewed in the circumferential direction. As a result, the rotor position sensor device always remains optimally oriented relative to the rotor of the electric machine.

For this purpose, the particular retaining section preferably includes a recess that has the shape of an elongated hole in each case, and that radially extends or is radially oriented in its longitudinal extension. This yields the advantages stated above. The detent lugs are radially displaceably guided due to the elongated hole shape. In particular, the radial guiding ensures that rotation or tilting of the support element, and thus of the rotor position sensor device, is reliably prevented.

The detent lugs preferably have a rectangular or circular cross section for the radial displacement at the particular recess, the cross section having a long side and a short side, and the long side being oriented in parallel to a radial line. The detent lugs together with the recesses thus cooperate as a centering device having a radial play. The diameter of the support element may thus change without the orientation of the rotor position sensor with respect to the electric machine changing as a result.

The support element is preferably made of plastic. A cost-effective implementation of the support element is thus made possible, which in particular allows a one-piece design of the detent lugs together with the support element and thus further simplifies the installation. The particular retaining section of the end shield, in particular the end shield as a whole, is preferably made of metal to ensure a particularly robust design.

According to one preferred refinement of the present invention, it is also provided that the particular detent lug has a slotted design in its radial longitudinal extension, so that each detent lug includes two detent lug sections, which when inserted into the retaining section are movable toward one another with elastic deformation. The detent lug sections are thus supported on one another, thus ensuring a particularly secure detent connection. In particular, each detent lug is thus held in a self-supporting manner at the particular associated retaining section.

The present invention is explained in greater detail below with reference to the figures.

DETAILED DESCRIPTION OF EXAMPLE EMBODIMENTS

Figure 1:
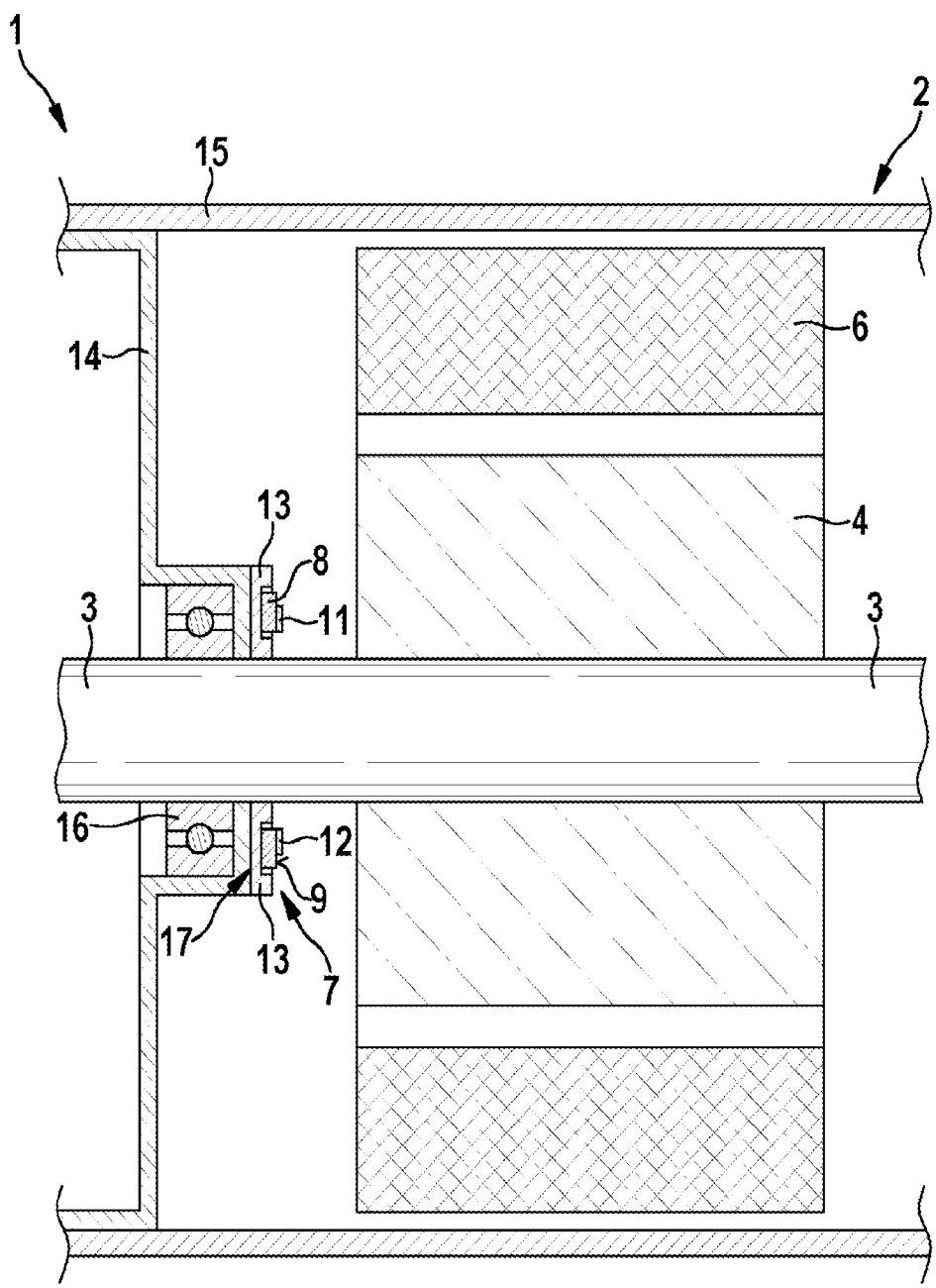
FIG. 1 shows a simplified illustration of an advantageous drive device for a braking device of a motor vehicle, in accordance with an example embodiment of the present invention.

FIG. 1 shows a simplified illustration of an advantageous drive device 1 for a consumer, not illustrated here in detail, of a braking device of a motor vehicle. The braking device is, for example, a parking brake of the motor vehicle, and the consumer is an axially displaceable brake piston that cooperates with a brake disk of a wheel of the motor vehicle.

For operating the consumer, drive device 1 includes an electric machine 2 with a drive shaft 3, a rotor 4 being rotatably fixedly situated on the drive shaft, and drive shaft 3 being rotatably supported in a housing 5, which is only indicated here. A stator 6 that is fixedly situated on the housing is associated with rotor 4. Stator 6 or rotor 5 has an in particular multiphase drive winding that may be acted on by a voltage via power electronics, not illustrated here, to generate a rotating magnetic field, via which electric machine 2 generates a torque that is transferred from drive shaft 3 to consumer 2. For this purpose, drive shaft 3 is, for example, permanently coupled to the consumer, or is coupleable thereto for a desired period of time.

A rotor position sensor device 7 that continuously monitors a rotor angle position of rotor 4 during operation via induction is associated with rotor 4 of electric machine 2. For this purpose, rotor position sensor device 7 includes a circuit board 8 which according to the present exemplary embodiment has a circular disk-shaped design and is situated coaxially with respect to drive shaft 3 of an end-face side of rotor 4. On its front side 9 facing rotor 4, circuit board 8 carries a rotor angle position sensor 12. The rotor angle position sensor preferably includes one or multiple transmitter coils and receiver coils, and in particular a control unit or processing unit, in particular an electronic evaluation unit 11 such as an analog ASIC that drives the coils, situated on a rear side 10 of circuit board 8 facing away from front side 9. However, according to the present exemplary embodiment, evaluation unit 11 is likewise situated on front side 9 of circuit board 8 facing rotor 4, next to the coils of rotor angle position sensor 12. In particular, the transmitter coil is acted on by a modulated signal that is induced into rotor 4 and led from rotor 4 back to the receiver coil. The received signal is demodulated and evaluated by evaluation unit 11 in order to ascertain an instantaneous rotor angle position. Rotor position sensor 8 is thus designed in the manner of a resolver.

Circuit board 8 is fastened to a support element 13 having a circular ring-shaped design. Support element 13 is situated coaxially with respect to drive shaft 3 of an end-face side of rotor 4 and mounted on an end shield 14. End shield 14 extends radially inwardly from a housing shell wall 15 of housing 5, in the direction of drive shaft 3. Situated between drive shaft 3 and end shield 14 is at least one pivot bearing 16, in the present case in the form of a rolling element bearing, whose inner ring rests against drive shaft 3 and whose outer ring is fastened to end shield 14. Drive shaft 3 is advantageously rotatably supported at housing 5 in this way.

Support element 13 is fastened to end shield 14. Multiple detent connections 17, explained in greater detail below with reference to FIGS. 3 through 4, are present for this purpose.

Figure 2:
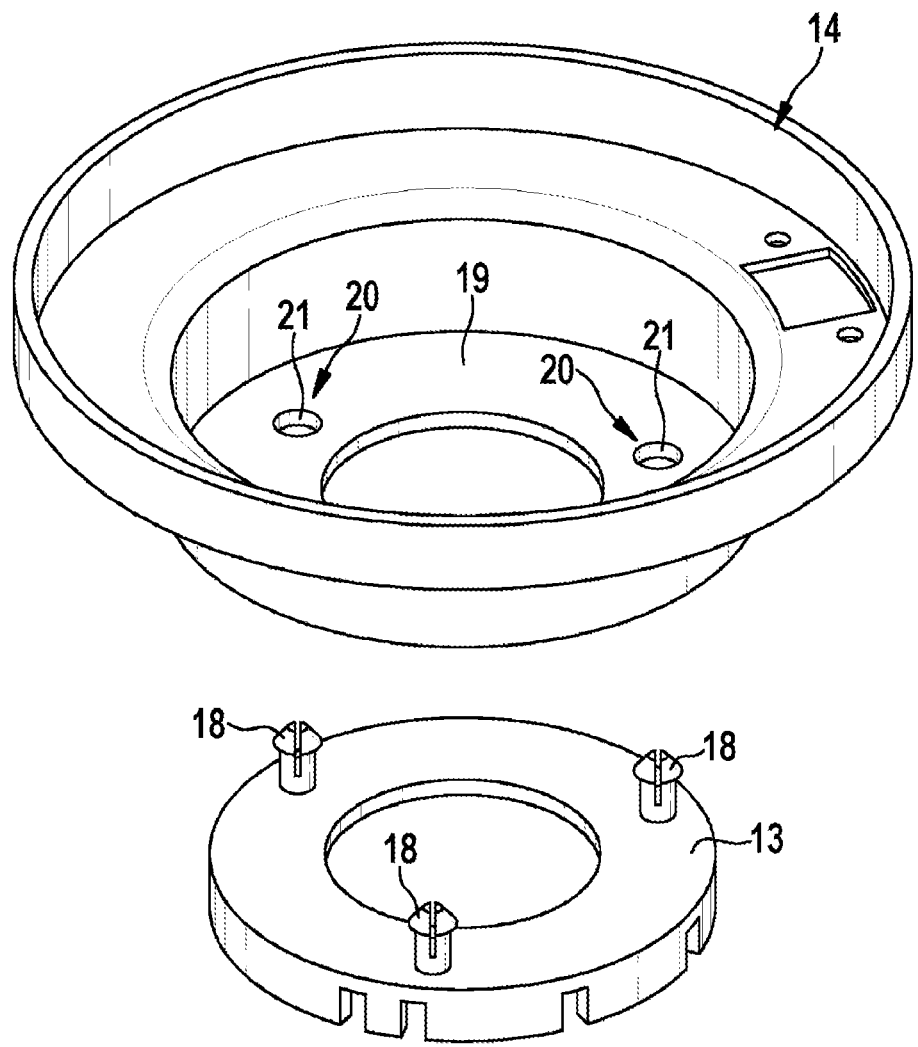
FIG. 2 shows an end shield of the drive device together with a support element in a perspective exploded illustration, in accordance with an example embodiment of the present invention.

In this regard, FIG. 2 shows a perspective exploded illustration of end shield 14 and support element 13. At its end-face surface facing end shield 14, support element 13 includes axially protruding detent lugs 18 that are uniformly spaced over the circumference of support element 13. On an end-face side 19, end shield 14 includes three retaining sections 20 whose design corresponds to detent lugs 18 in end shield 14. A recess 21 that is used in each case to accommodate one of detent lugs 18 is formed in each retaining section 20.

Figure 3:
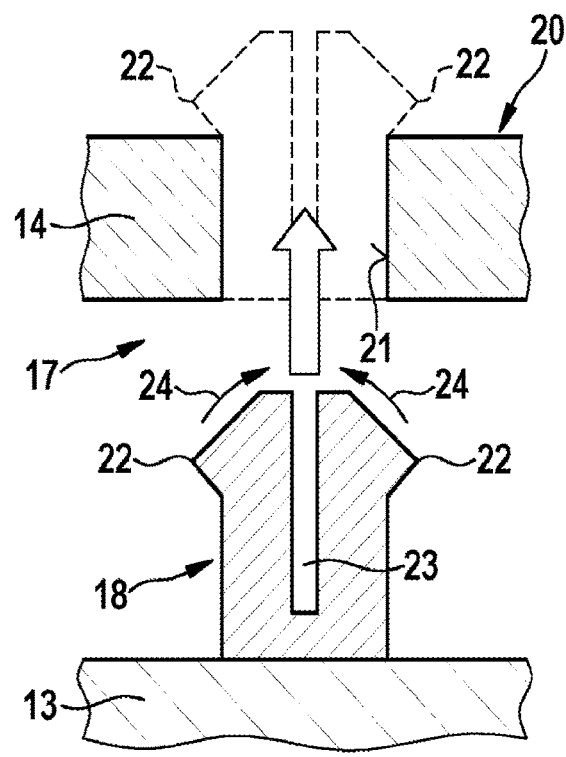
FIG. 3 shows a detailed view of the end shield and the support element, in accordance with an example embodiment of the present invention.

In this regard, FIG. 3 shows a simplified detailed view of the operating principle of particular detent connection 17. FIG. 3 shows a sectional illustration of one of detent connections 17 in the not yet connected state. Each detent lug 18 of support element 13 has a rectangular cross section, and at its free end side includes two laterally protruding detent projections 22. Particular detent lug 18 has a slotted design, so that a longitudinal slot 23 is situated between detent projections 22. This slot 23 has a wide design so that the detent lug sections arising via slot 23 are movable relative to one another, as shown by arrows 24 in FIG. 3. The spacing between detent projections 22 is greater than the clearance of particular recess 21 in end shield 14. If a detent lug 18 is now inserted into associated recess 21, detent projections 22 are moved toward one another with elastic deformation via their respective run-up slope 25, which strike retaining section 20 of end shield 14, so that detent lug 18 may completely penetrate into recess 21 until detent projections 22 have completely penetrated recess 21 in order to spring back radially outwardly behind the recess, as the result of which particular detent lug 18 engages in a form-fit manner behind end shield 14 at retaining section 20. As an alternative to a design of detent lugs 18 having a rectangular cross section, according to a further exemplary embodiment as shown in FIG. 2, it is provided that the detent lugs have a circular cross section or a circular contour.

Figure 4:
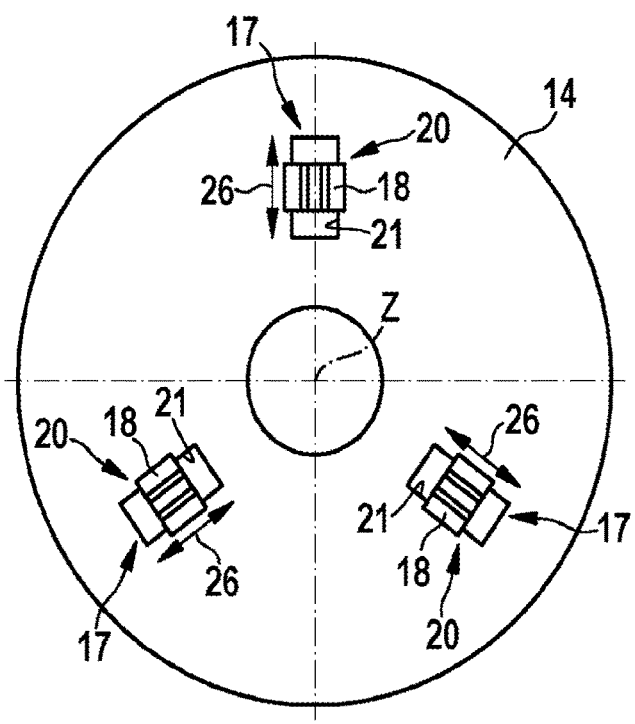
FIG. 4 shows a schematic top view onto the end shield, in accordance with an example embodiment of the present invention.

FIG. 4 shows a top view onto end shield 14, in particular, the end-face side facing away from support element 13. It is apparent that recesses 21 each have an elongated hole-shaped or rectangular design, their longitudinal extension extending radially with respect to center Z of end shield 14 or with respect to the rotational axis of drive shaft 3. Since recesses 21 are also uniformly distributed over the circumference of the end-face side of end shield 14, they are situated in each case at an angle of 120° relative to one another, corresponding to detent projections 18.

Due to the rectangular cross section of detent projections 18, as is likewise clearly apparent in FIG. 4, and the design of recesses 21 in the shape of an elongated hole, detent lug 18 is radially displaceably supported in associated recess 21, as shown by double arrows 26 in FIG. 4. Radial play is thus present even in the locked state of support element 18 at end shield 14, as the result of which the orientation of support element 13 at end shield 14 does not change, despite different thermal expansion coefficients of support element 13 and end shield 14. In particular, rotation about center Z is advantageously avoided due to the advantageous detent device.

By use of the described advantageous detent geometry, rotor position sensor 8 is held in position in such a way that it always has a stable and precise position with respect to electric machine 2, and a sufficient tolerance compensation in the radial direction is ensured. Support element 13 is preferably made of plastic and end shield 14 is preferably made of metal, an electrically conductive connection at the rotor position sensor with end shield 14 being reliably prevented by plastic support element 13. The detent device also provides a permanent tight fit over the entire service life of drive device 1 under widely varying temperature conditions. The advantageous orientation of recesses 21 and detent projections 18 ensures that support element 13 is held in the center of rotation of drive shaft 3 or of rotor 3 over the entire temperature range. Drive device 1 is easily installed by merging support element 18 at end shield 14, with elastic deformation of the detent projections. As the result of detent lugs 18, slight radial sliding of detent lugs 18 in particular recess 21 is made possible when the materials used have different thermal expansions.

What is claimed is:

1. A drive device for a braking device of a motor vehicle, comprising:
    an electric machine that includes a housing and a rotor that is rotatably supported in the housing; and
    a rotor position sensor device that includes a circuit board with at least one sensor element that is associated with the rotor, the circuit board being circular disk-shaped and being situated coaxially with respect to a rotational axis of the rotor;
    wherein the circuit board is fastened in or at the electric machine via at least one detent connection,
    wherein the circuit board is pre-installed on a circular ring-shaped support element,
    wherein the support element includes at least one axially protruding, elastically deformable detent lug, which in an installed state engages behind an associated retaining section of the electric machine,
    wherein the circuit board is mounted on a first surface of the support element,
    wherein each detent lug projects from a second surface of the support element opposite to the first surface, and
    wherein in the installed state each detent lug projects from the second surface and into the associated retaining section of the electric machine without engaging the circuit board.

2. The drive device as recited in claim 1, wherein the support element is made of plastic and/or the retaining section is made of metal.

3. The drive device as recited in claim 1, wherein the electric machine includes an end shield via which a drive shaft of the electric machine carrying the rotor is rotatably supported, and which forms the retaining section.

4. The drive device as recited in claim 3, wherein the support element includes three detent lugs that are uniformly distributed over a circumference of the support element, and the end shield includes three respective retaining sections that cooperate with the detent lugs.

5. The drive device as recited in claim 4, wherein each detent lug is radially displaceably supported in a respective recess of the respective retaining section.

6. The drive device as recited in claim 5, wherein each respective recess is in a shape of an elongated hole, and in its longitudinal extension is radially oriented.

7. The drive device as recited in claim 6, wherein each of the detent lugs has a rectangular cross section for a radial displacement in the respective recess, a cross section having a long side and a short side, and the long side being oriented in parallel to a radial line.

8. The drive as recited in claim 5, wherein each detent lug has a slotted design in its radial longitudinal extension, so that through the slotted design for each detent lug, detent lug sections are movable toward one another with elastic deformation when inserted into the respective retaining section.

9. The drive as recited in claim 3, wherein each detent lug is radially displaceable outwardly in relation to the rotational axis of the rotor such that each detent lug yields radially outwardly when a material of the support element experiences a greater increase in size than does the end shield due to a thermal expansion coefficient of the support element being different than a thermal expansion coefficient of the end shield, wherein, as a result of each detent lug yielding radially outward when the support element experiences the greater increase in size, an orientation of the support element at the end shield does not change.

* * * * *